United States Patent
Todorovic

(10) Patent No.: US 8,407,804 B2
(45) Date of Patent: Mar. 26, 2013

(54) SYSTEM AND METHOD OF WHITELISTING PARENT VIRTUAL IMAGES

(75) Inventor: Rade Todorovic, Abingdon (GB)

(73) Assignee: Sophos PLC, Abingdon (GB)

( * ) Notice: Subject to any disclaimer, the term of this patent is extended or adjusted under 35 U.S.C. 154(b) by 309 days.

(21) Appl. No.: 12/880,444

(22) Filed: Sep. 13, 2010

(65) Prior Publication Data

US 2012/0066762 A1  Mar. 15, 2012

(51) Int. Cl.
*H04L 29/06* (2006.01)

(52) U.S. Cl. ............... 726/26; 726/24; 726/25

(58) Field of Classification Search ............. 726/26, 726/24, 25
See application file for complete search history.

(56) References Cited

U.S. PATENT DOCUMENTS

| | | | |
|---|---|---|---|
| 6,081,665 A * | 6/2000 | Nilsen et al. .................. 717/116 |
| 6,735,700 B1 * | 5/2004 | Flint et al. ........................ 726/24 |
| 7,246,174 B2 * | 7/2007 | Sciandra et al. .............. 709/244 |
| 7,356,679 B1 * | 4/2008 | Le et al. ............................ 713/1 |
| 7,490,353 B2 * | 2/2009 | Kohavi ............................ 726/22 |
| 7,849,502 B1 * | 12/2010 | Bloch et al. ...................... 726/11 |
| 7,849,507 B1 * | 12/2010 | Bloch et al. ...................... 726/22 |
| 8,011,010 B2 * | 8/2011 | Michael et al. .................. 726/24 |
| 8,087,082 B2 * | 12/2011 | Bloch et al. ...................... 726/22 |
| 8,151,263 B1 * | 4/2012 | Venkitachalam et al. ......... 718/1 |
| 8,196,205 B2 * | 6/2012 | Gribble et al. .................. 726/24 |
| 2006/0155674 A1 * | 7/2006 | Traut et al. ......................... 707/2 |
| 2006/0155735 A1 * | 7/2006 | Traut et al. ..................... 707/101 |
| 2006/0190606 A1 * | 8/2006 | Kohavi .......................... 709/226 |
| 2006/0195715 A1 * | 8/2006 | Herington .......................... 714/4 |
| 2007/0028110 A1 * | 2/2007 | Brennan ........................ 713/176 |
| 2007/0028291 A1 * | 2/2007 | Brennan et al. .................... 726/1 |
| 2007/0028303 A1 * | 2/2007 | Brennan ........................ 726/24 |
| 2007/0028304 A1 * | 2/2007 | Brennan ........................ 726/24 |
| 2007/0050777 A1 * | 3/2007 | Hutchinson et al. .......... 718/104 |
| 2007/0079307 A1 * | 4/2007 | Dhawan et al. .................... 718/1 |
| 2007/0089111 A1 * | 4/2007 | Robinson et al. ................. 718/1 |
| 2007/0094348 A1 * | 4/2007 | Scheidel et al. .............. 709/217 |
| 2007/0169069 A1 * | 7/2007 | Burka et al. ................... 717/166 |
| 2007/0174915 A1 * | 7/2007 | Gribble et al. .................. 726/24 |
| 2007/0220061 A1 * | 9/2007 | Tirosh et al. .................. 707/200 |
| 2007/0245334 A1 * | 10/2007 | Nieh et al. ..................... 717/168 |
| 2008/0028402 A1 * | 1/2008 | Senoo ............................... 718/1 |
| 2008/0134175 A1 * | 6/2008 | Fitzgerald et al. ................ 718/1 |
| 2008/0134176 A1 * | 6/2008 | Fitzgerald et al. ................ 718/1 |
| 2008/0134177 A1 * | 6/2008 | Fitzgerald et al. ................ 718/1 |
| 2008/0134178 A1 * | 6/2008 | Fitzgerald et al. ................ 718/1 |
| 2008/0163210 A1 * | 7/2008 | Bowman et al. .................. 718/1 |
| 2008/0184225 A1 * | 7/2008 | Fitzgerald et al. ................ 718/1 |

(Continued)

*Primary Examiner* — David Garcia Cervetti
(74) *Attorney, Agent, or Firm* — Strategic Patents, P.C.

(57) ABSTRACT

In embodiments of the present invention improved capabilities are described for virtual machine scan optimization. In response to a change in the primary virtual machine, the virtual machine scan optimization may involve comparing the primary virtual machine to the related virtual machine and tracking changes of the primary virtual machine with respect to the related virtual machine wherein the changes are identified by location within the primary virtual machine; forming a tracked changes log; generating a relevant file map of the primary virtual machine wherein the relevant file map includes a plurality of relevant files and each of the plurality of relevant files' locations in the primary virtual machine; comparing the changed locations identified in the track changes log with the locations of the plurality of relevant files to determine if any one of the plurality of relevant files has been changed; and in the event that a relevant file has been changed, as indicated by the comparison of the relevant file map to the tracked changes log, causing the changed relevant file to be security scanned.

8 Claims, 5 Drawing Sheets

U.S. PATENT DOCUMENTS

| | | | |
|---|---|---|---|
| 2008/0263658 A1* | 10/2008 | Michael et al. | 726/22 |
| 2008/0301235 A1* | 12/2008 | Mankiewicz | 709/206 |
| 2009/0328221 A1* | 12/2009 | Blumfield et al. | 726/24 |
| 2010/0083251 A1* | 4/2010 | McCrory et al. | 718/1 |
| 2010/0138894 A1* | 6/2010 | Kyojima | 726/1 |
| 2010/0169948 A1* | 7/2010 | Budko et al. | 726/1 |
| 2011/0047618 A1* | 2/2011 | Evans et al. | 726/23 |
| 2011/0106863 A1* | 5/2011 | Mamidi et al. | 707/823 |
| 2011/0179415 A1* | 7/2011 | Donnellan et al. | 718/1 |
| 2011/0191341 A1* | 8/2011 | Meyer et al. | 707/736 |
| 2012/0110574 A1* | 5/2012 | Kumar | 718/1 |
| 2012/0159478 A1* | 6/2012 | Spradlin et al. | 718/1 |
| 2012/0291030 A1* | 11/2012 | Fitzgerald et al. | 718/1 |

* cited by examiner

SYSTEM AND METHOD OF WHITELISTING PARENT VIRTUAL IMAGES

BACKGROUND

1. Field

The present invention is related to optimizing the scanning of virtual machines.

2. Description of the Related Art

With increased use of virtualization, the traditional approach of treating virtual machines as physical machines is increasingly inadequate, because it does not take advantage of the opportunities in the virtualized world. With consolidation of many virtual machines on a single server, the resources needed to scan those virtual machines must be found on this single server, which creates a bottleneck. On the other hand, security products' users don't want security to be diminished, compared to the physical machine case. As a result, there is a need in the art to optimize the treatment of virtual machines to ensure security but ease resource consumption.

SUMMARY

One of the great inefficiencies in scanning virtual machines arises when a number of virtual machines are similar; in those cases, the same files are present on a range of machines but are scanned as though they were distinct files. The same problem exists in the storage domain, and can be solved by using the virtual image "parent-child" relationship, where the multitude of images are derived ("children") from a single base ("parent") image. The child images store only modifications to their parent images.

The present invention makes use of the parent-child relationship to perform basically the same optimization in the virtual image scanning domain without having to displace the scanning function out of the virtual machine, such as into a dedicated scanning appliance or into the hypervisor, which may not optimize the scan per se, but may allow for easier scheduling of resources necessary to perform the scan. Additionally, scans need not be conducted on every virtual image as a completely separate unit.

In an aspect of the invention, a computer program product may be embodied in a computer readable medium that, when executing on one or more computers, reduces scanning requirements of a primary virtual machine based on an understanding of a related virtual machine, by performing the steps of: in response to a change in the primary virtual machine, comparing the primary virtual machine to the related virtual machine and tracking changes of the primary virtual machine with respect to the related virtual machine wherein the changes are identified by location within the primary virtual machine, forming a tracked changes log; generating a relevant file map of the primary virtual machine wherein the relevant file map includes a plurality of relevant files and each of the plurality of relevant files' locations in the primary virtual machine; comparing the changed locations identified in the track changes log with the locations of the plurality of relevant files to determine if any one of the plurality of relevant files has been changed; and in the event that a relevant file has been changed, as indicated by the comparison of the relevant file map to the tracked changes log, causing the changed relevant file to be security scanned. If a tracked change exists, but the map indicates that no relevant files reside in that location, then no security scan may be done. An alert may be generated prior to the security scan. The steps may further include allowing the security scan to be deferred by a user. The steps may further include if a change in the related virtual machine is indicated in the tracked changes log, the user is given the option of performing additional tasks. The additional task may be updating a policy prior to a re-scan. The additional task may be deploying a remedial action. The additional task may be encrypting the data.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
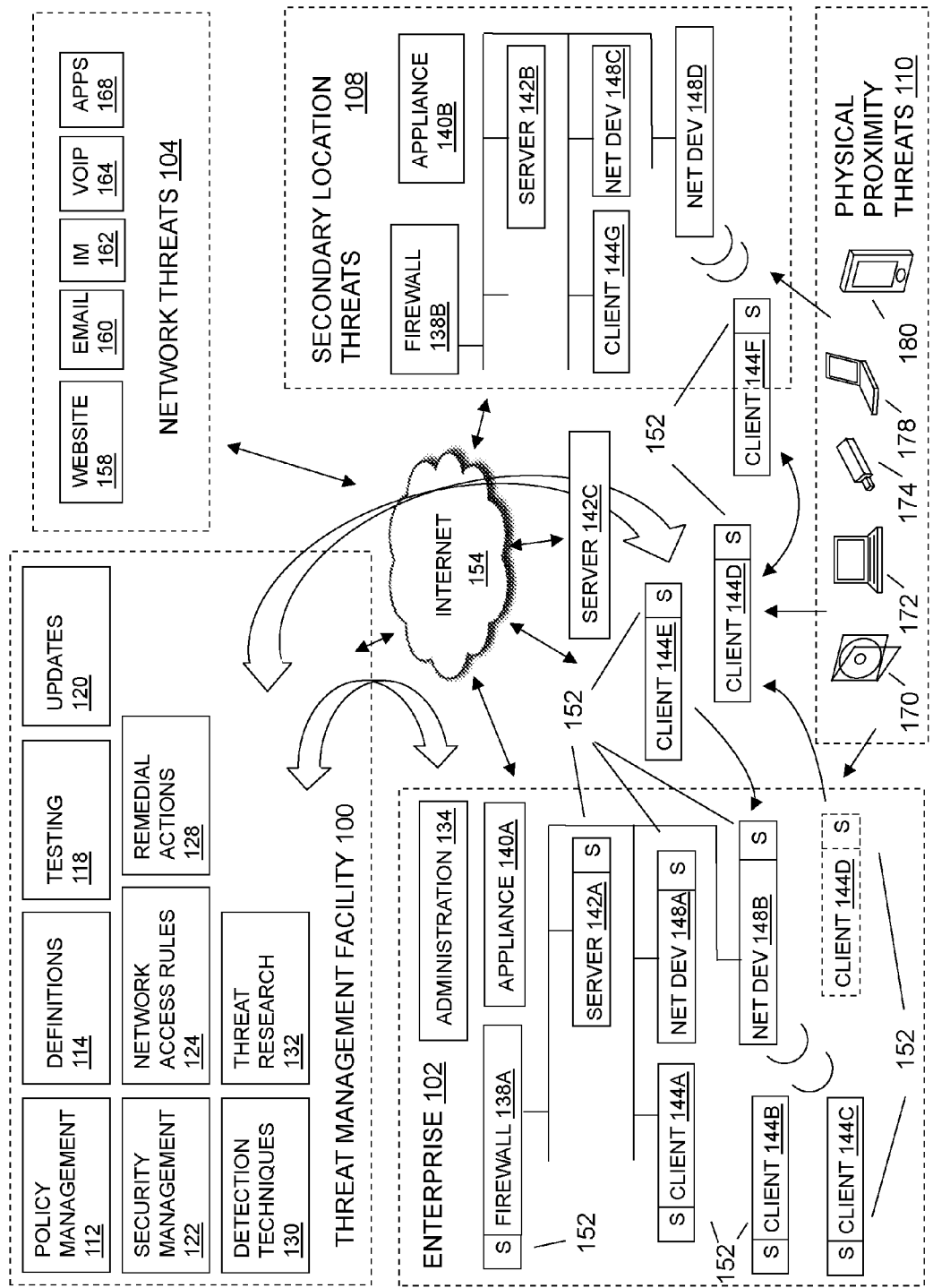
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, such as the server facility 142, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facilities 144 that have moved into network connectivity not directly associated or controlled by the enterprise facility 102. Threats to client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148A or wireless network facilities 148B. Client facilities 144 connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the internet 154 outside the enterprise facility 102, and therefore outside the threat-protected environment of the enterprise facility 102. In this instance the mobile client facility 144B-F, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144D-F that has an embedded end-point computer security facility 152, such as by providing URI filtering in personal routers, using a web appliance as a DNS proxy, or the like. Mobile client facilities 144D-F that are components of the enterprise facility 102 but temporarily outside connectivity with the enterprise facility 102 network, may be provided with the same threat protection and policy control as client facilities 144 inside the enterprise facility 102. In addition, mobile client facilities 144B-F may receive the same interactions to and from the threat management facility 100 as client facilities 144 inside the enterprise facility 102, where mobile client facilities 144B-F may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144F is in a secondary location 108 or connecting wirelessly to a non-enterprise facility 102 wireless internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of virtual machine scan optimization embodiments. It should be understood that the following embodiments may be managed through a threat management facility 100 along with other services, such as those described herein.

The need for optimizing on-access and on-demand scans in virtualization scenarios has existed since virtualization was introduced. However, a prevalent use case today, server virtualization, does not make heavy use of virtual image "snapshots" or "parent-child" relationship, and generally each virtual machine is different. The prior art approach to optimization has been to move the on-demand scan of virtual machines outside the virtual machine itself, without any improvements to the on-access scan performance. Various whitelisting technologies are widely used to skip scanning of "known good" files. However, there is a problem of maintaining the database of all "known good" files and bringing the database down to the endpoint, which may be realized as a cloud lookup, requiring network connectivity.

The invention consists of a computer system capable of scanning child virtual images in an optimized manner in real time. Various types of scans of child virtual images, such as anti-virus, on-access or on-demand scan, data-at-rest scan, and the like, may be optimized by whitelisting the contents of the parent virtual image. As such, it can be used in virtualization scenarios which use of virtual image parent-child relationship, since child virtual machines share basically the same data by the virtue of having their virtual images derived from the same "parent" image. One such scenario is desktop virtualization, but other scenarios are also conceivable, such as a research/lab scenario with snapshots, and the like.

In the present invention, whitelisting is used to signify not that the file is "known good", but that it is the responsibility of another process to scan it. For example, this concept applies to scenarios like desktop virtualization, where responsibility to scan a file can be moved from a process scanning the child image to the process scanning the parent image. And, if a problem is detected in the parent image, information relating to the problem can be used to manage the problem in the child, for example.

For example, the contents of the parent machine may be whitelisted at a point in time prior to or concurrent with child creation such that the contents of the parent machine are whitelisted. The contents of the parent image that may be whitelisted may include the OS, applications, files, and the like. When a change is made in the child, the virtual machine scan optimization facility 200, a comparison between the parent and child is made that results in a log being generated that shows what memory location has been changed ("delta log"). The virtual machine scan optimization facility 200 also makes a map of what relevant files there are that need to be re-scanned if they are edited and where they reside on the child. If the delta log, or tracked changes log, indicates a change and the change is in a relevant file, then the child may be re-scanned. If delta log indicates a change in a memory location, but the map indicates that no relevant files reside in that memory location, then there may be no need to re-scan the child even if there are changes. In an embodiment, if a re-scan is indicated, an alert may be generated. In an embodiment, a user may be asked if they want to defer the scan. In an embodiment, if a change in the child image is indicated in the delta log, the user may be given the option of performing additional tasks, such as updating a policy 120 prior to a re-scan, deploying a remedial action 128, and the like.

Figure 2:
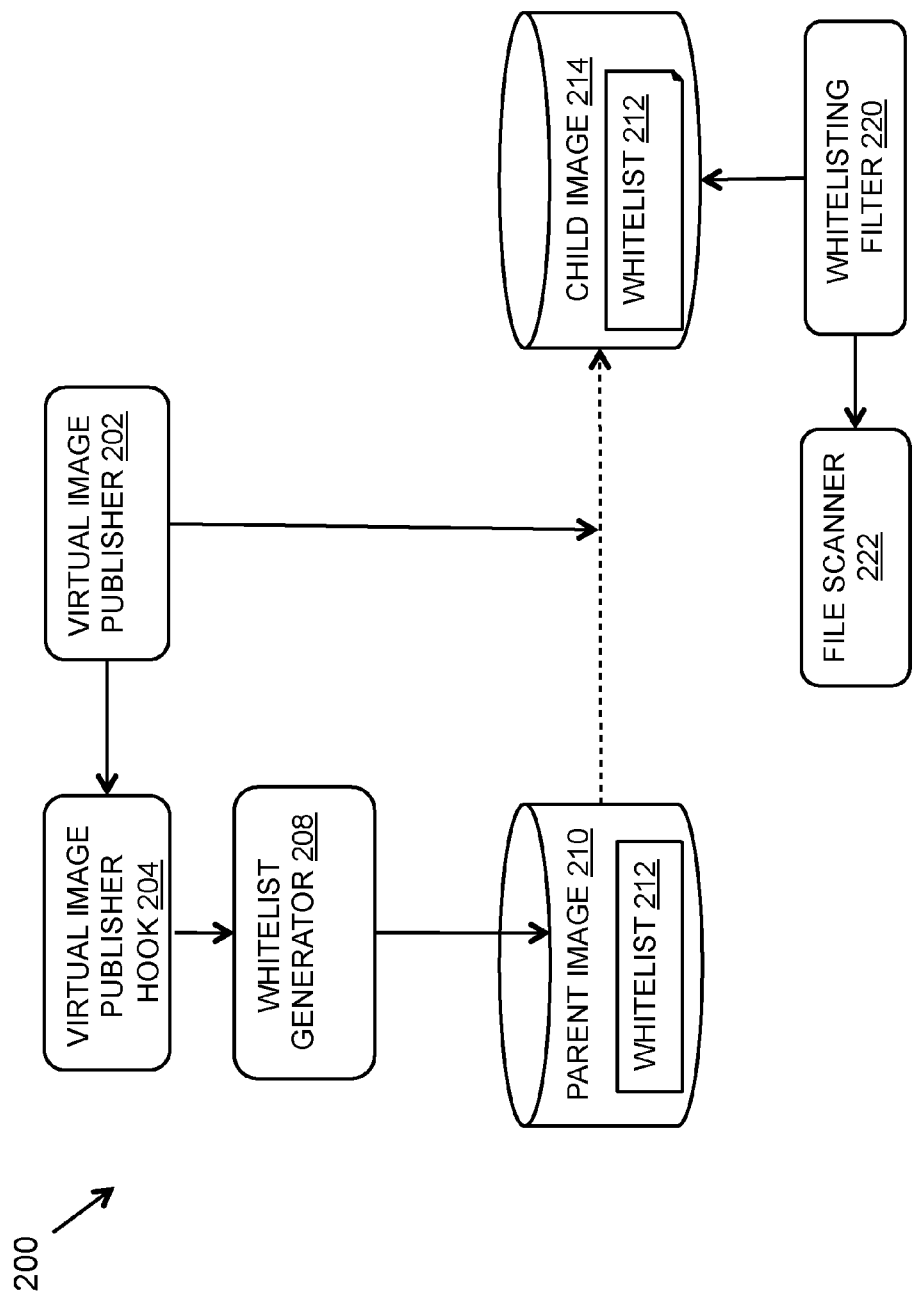
FIG. 2 depicts a block diagram of a virtual machine scan optimization facility.

Referring to FIG. 2, the virtual machine scan optimization facility 200 may include a virtual image publisher 202, a file scanner 222, a whitelist 212 stored on a parent image 210 and/or a child image database 214, a whitelisting filter 220, a virtual image publisher hook 204, and a whitelist generator 208. The virtual image publisher 202 may be responsible for creating child virtual images 214 from parent virtual images 210. This component may be activated to create a new virtual machine in a server virtualization, desktop virtualization, research/labs virtualization, unmanaged virtualization or other virtualization scenarios. The parent-child relationship in some of these scenarios may be known as an image-snapshot relationship wherein the parent is a snapshot of the image in the past, to which the image can be reverted to.

The file scanner 222 may perform static (content) analysis on files, such as by being an anti-virus on-access scanner, an on-demand scanner; a Data Leakage Prevention (DLP) "data at rest" scanner, a "data at motion" scanner, and the like.

A whitelist 212 may be a list of checksums of files which are excluded from scanning. A cryptographically sound hash algorithm may be used for checksumming, so that different files cannot, in practice, have the same checksum. The hash algorithm may be more efficient than the algorithm used to scan the files. The whitelist for exclusion of files on a given virtual disk may be stored on the same disk, in embodiments, as another file. To be "excluded" may mean different things for different file scanners. For example for anti-virus scanners, "excluded" may mean "clean"; for DLP scanners, "excluded" may mean "not confidential".

The whitelisting filter 220 may perform filtering of files before they are passed to the file scanner 222. The whitelisting filter 220 may checksum the file, and if it is on the whitelist 212, may not pass the file to the file scanner 222.

The virtual image publisher hook 204 may bind to the virtual image publisher 202 so that it can invoke an action to be performed when a child virtual image 214 is created. The various virtualization solution providers may or may not support virtual image publisher hooks 204. If unsupported, the virtual machine scan optimization facility 200 may be based on an externally added hook, such as via filtering the file operations issued by the virtualization solution.

The whitelist generator 208 may be triggered by the virtual image publisher hook 204. The whitelist generator 208 may be responsible for providing the whitelist 212.

Figure 3:
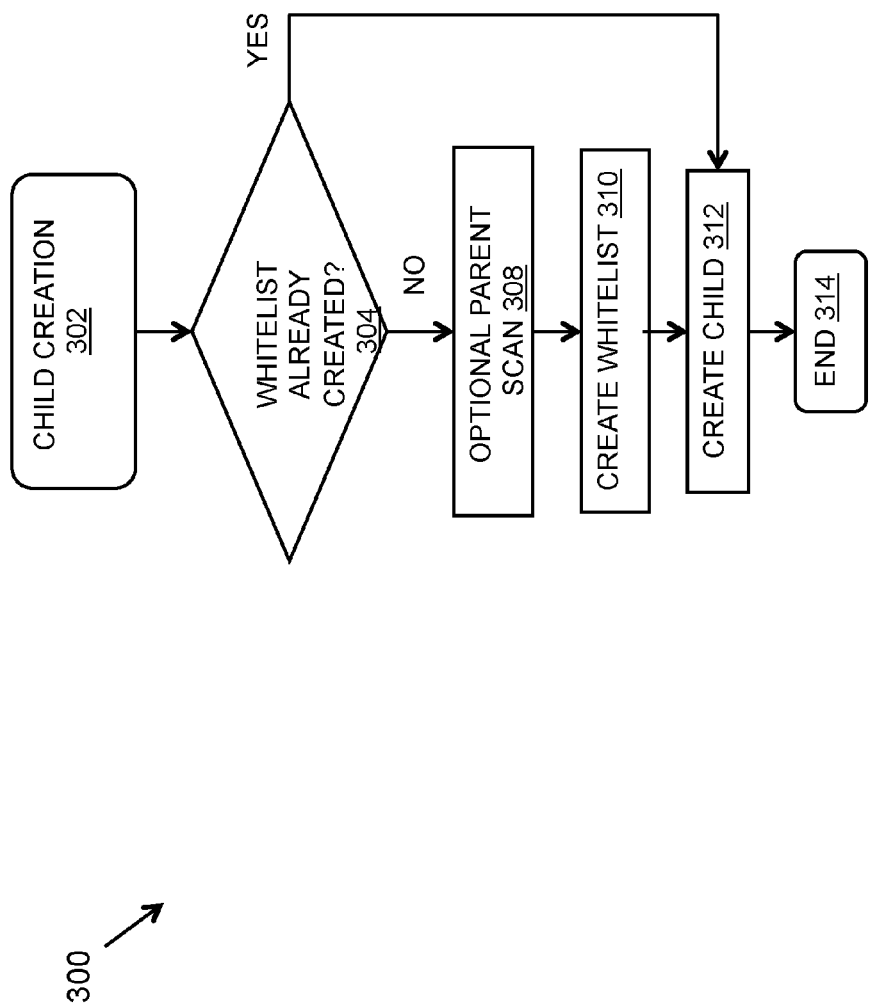
FIG. 3 depicts a child creation process.

Referring to FIG. 3, child creation 302 may be triggered from the virtual image publisher 202 via the virtual image publisher hook 204 call into the whitelist generator 208. In the process for child creation 302, if the whitelist is already created 304, the child is created 312. If the whitelist is not yet created, the whitelist generator's 208 responsibility is to create the whitelist 310 containing all the files on the parent virtual image and place it onto the parent image 210 before the child is actually created 312 whereupon the process ends 314. In case there are multiple children associated with the same parent, this process needs to be done only once, assuming the parent is not further modified. The child creation 302 process may include an optional parent scan 308 to scan the parent virtual image. Even while the parent image 210 is used in conjunction with one or more child images 214, and is therefore considered read-only, it can still be scanned on-demand, periodically. If the parent is itself a child of another parent, the virtual machine scan optimization facility 200 may be used to optimise this parent scan 308 even further.

Figure 4:
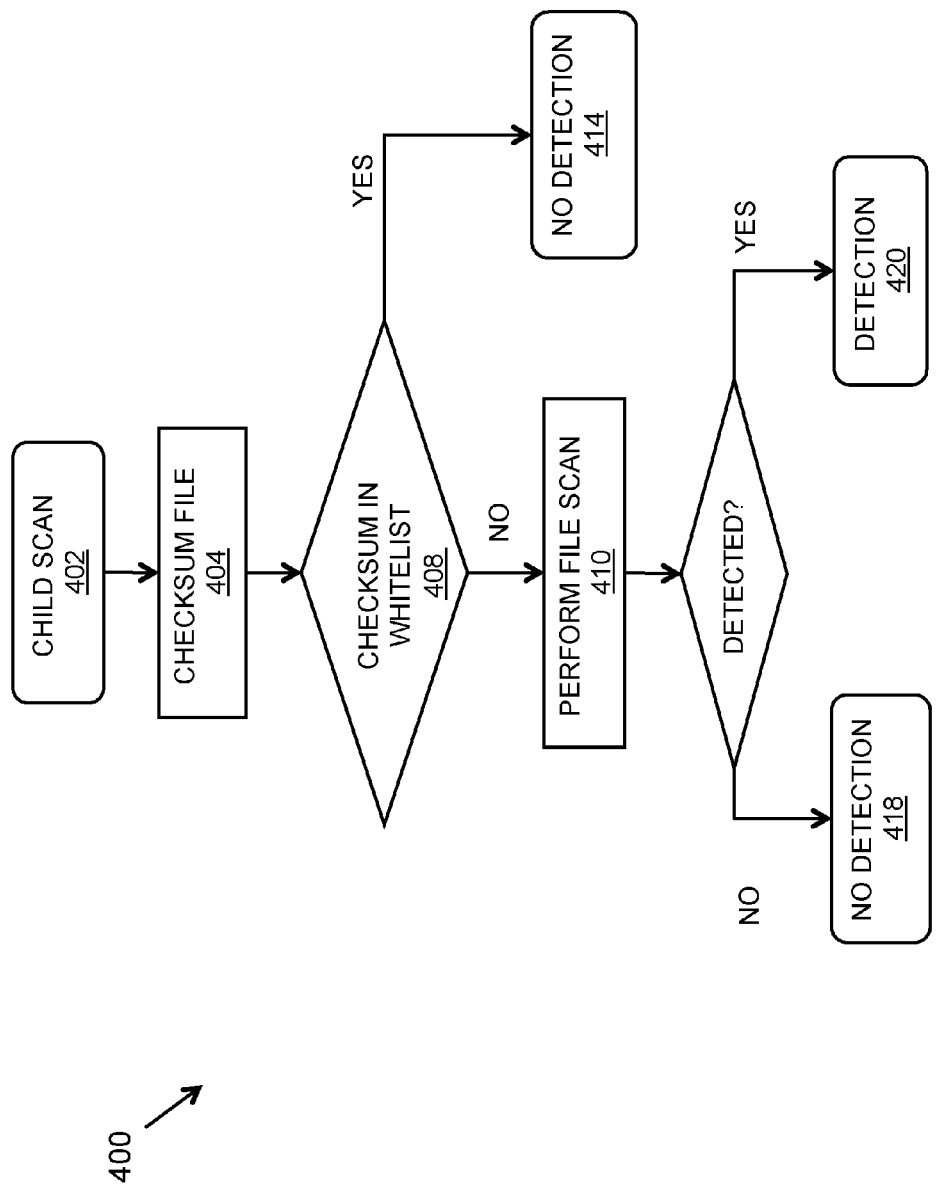
FIG. 4 depicts a child scan process.

Referring to FIG. 4, a child scan is optimized by the virtual machine scan optimization facility 200. The file to be scanned is passed to the whitelisting filter 220, which will checksum the file 404 and look it up in the whitelist 408 (as inherited by the child image 214 from the parent image 210). If the file is on the whitelist 212, it is excluded 414. Otherwise it is passed to the file scanner 222 to perform a file scan 410, wherein changes may be detected 420 or not detected 418.

In an embodiment, if the parent scan 308 results in a detection of a file change, an emergency process may be initiated.

In an embodiment, the virtual machine scan optimization facility 200 and related processes for child creation 302 and child scanning 402 may be included in a workflow. In the workflow, an administrator may decide to publish a parent ("base") image in a particular virtualization scenario. After the parent image is published, but before the child image may be created, the child creation 302 process is triggered to create the whitelist 212 on the parent image 210. The whitelist 210 is inherited by the child image(s) 214. Any child scan 402 is optimized because only those files that are not on the whitelist 212 are actually scanned. This means, in practice, that only those files that exist on the child image 214 but don't exist on the parent image 212 are scanned. If the child scan 302 results in detection, the detection is dealt with in the ordinary manner, such as by treating the virtual machine as it were a physical one. In parallel with that, a parent scan 308 may be performed periodically or on demand. Normally there may be no need to re-scan the parent very often, since it does not get modified. However, there may be a need to re-scan it after an update of the virus data or the policies. If the parent scan 308 results in detection, one of emergency workflows may be triggered.

Some examples of emergency workflows may be in the anti-virus scenario. For example, the administrator may be alerted so that he/she can switch off all the child virtual images, disinfect the parent and re-create the children again. This workflow may be aligned with the common virtual machine lifecycle in the desktop virtualization scenario. In another emergency workflow, a special type of scan, involving just the file scanner 222, but not whitelisting filter 220, can be run on all the children, so that all those images get scanned and disinfected.

In an embodiment, optimized whitelist creation may be a fairly slow process, because it requires traversing the whole parent image and checksumming all the files. In case the parent image is a child of another image ("grandparent"), the grandparent's whitelist can be used as a base for the parent's whitelist as follows: 1) All the parent's directories are traversed. 2) Instead of checksumming every file, the whitelist generator may determine just the placement of the file on the image (i.e. clusters on the image used by the file contents). 3) The file may be checksummed only if at least one of those clusters lies outside the grandparent image. 4) The final parent's whitelist is a union of the grandparent's whitelist and the checksums obtained in step 3 above. This results in an optimization because generating the whitelist may now require reading just the file system metadata instead of reading (and checksumming) all of the file data. Thus, it is possible to derive the list of modified files from the list of modified sectors/clusters.

In another embodiment of optimized whitelist creation, if the parent scan process is employed, the whitelist may be created during the parent scan. In this case, the parent scan may be performed as a part of the child creation, and at the same time the whitelist is built. This option may be used in case of an anti-virus scanner, to ensure that the parent image is "clean" before any children are produced. (In that case, Child creation is terminated if the image is not "clean"). Whitelist creation may be optimized here because traversal of the image and checksumming of all the files is performed during the parent scan anyway.

In embodiments, the generated whitelist does not depend on the scan itself This means that many different kinds of scans may be involved, but only a single whitelist may be needed. In this sense, the coupling between the whitelist creation and the parent scan, while potentially useful, may be slightly unnatural.

In an embodiment, virtual machine scan optimization may be suitable to desktop virtualization scenarios, where a number of virtual desktops are created as children of a "base" image. There are two important cases: (1) Every user gets a virtual desktop, which is a copy (or a child) of the base image, but the base image is never updated, or (2) The base image is regularly updated and the child is re-created every time. In scenario (1), opting for a child will at least optimize scanning those files that are present on the base image, but over time those images will diverge and scanning them in an optimized manner becomes increasingly difficult. However, in scenario (2) the images may be usually kept fairly in sync, and updates to the OS and applications may be distributed via changes in the base image in a centralized manner. This scenario may be heavily optimized by the virtual machine scan optimization process and facility described herein so that neither the OS nor the applications need to be re-scanned on every virtual machine. In server virtualization scenarios, virtual machine scan optimization may be useful if there is a pool of similar servers (or at least servers based on the same OS), which can be created as children of a given base image. In the research/lab scenario, virtual machine scan optimization may be applicable to snapshots, in a limited manner, but if snapshots are created often, the overhead of the child creation process may or may not be bigger than the savings during scans of children. By carefully planning the infrastructure (e.g. starting from a common root parent and building the virtual machines on top of it using multiple-level inheritance) the administrator may be able to top the balance to the side of better performance. In all of these scenarios, the administrator may decide that parent scan is not necessary for certain parents. For example, in the anti-virus scenario, if the root parent is a fresh OS installation from a trusted medium, or if the procedures for creating and publishing the base image are secure enough, the parent scan may be unnecessary or it can be made very infrequently. In essence, instead of a global whitelisting solution (which can identify all the "known good" applications in the world), this system makes the administrator specify the "known good" parent image for a particular organization, which is never unnecessarily re-scanned again.

Whitelisting of the parent as described herein does not preclude other types of whitelisting, for example based on file name/extension/metadata, file reputation, or further file whitelists, such as local or "in the cloud".

With respect to anti-virus, if a zero-day attack makes its way to the parent image and subsequently to child images, once the detection for this attack is available, no children will be able to detect the attack—only parent scan will (with invoking an emergency workflow afterwards). This means that the effectiveness of the on-access scan on the children will be diminished. The mitigation techniques here are: 1) Parent images are usually (in particular in desktop virtualization scenarios) much more tightly controlled than child images, or they come from a trusted source. Therefore the scenario itself is unlikely; and 2) Since the whole scan is optimized, the administrator can afford to run the parent scan more often (e.g. each time there is an update of virus data or of the policy.

Figure 5:
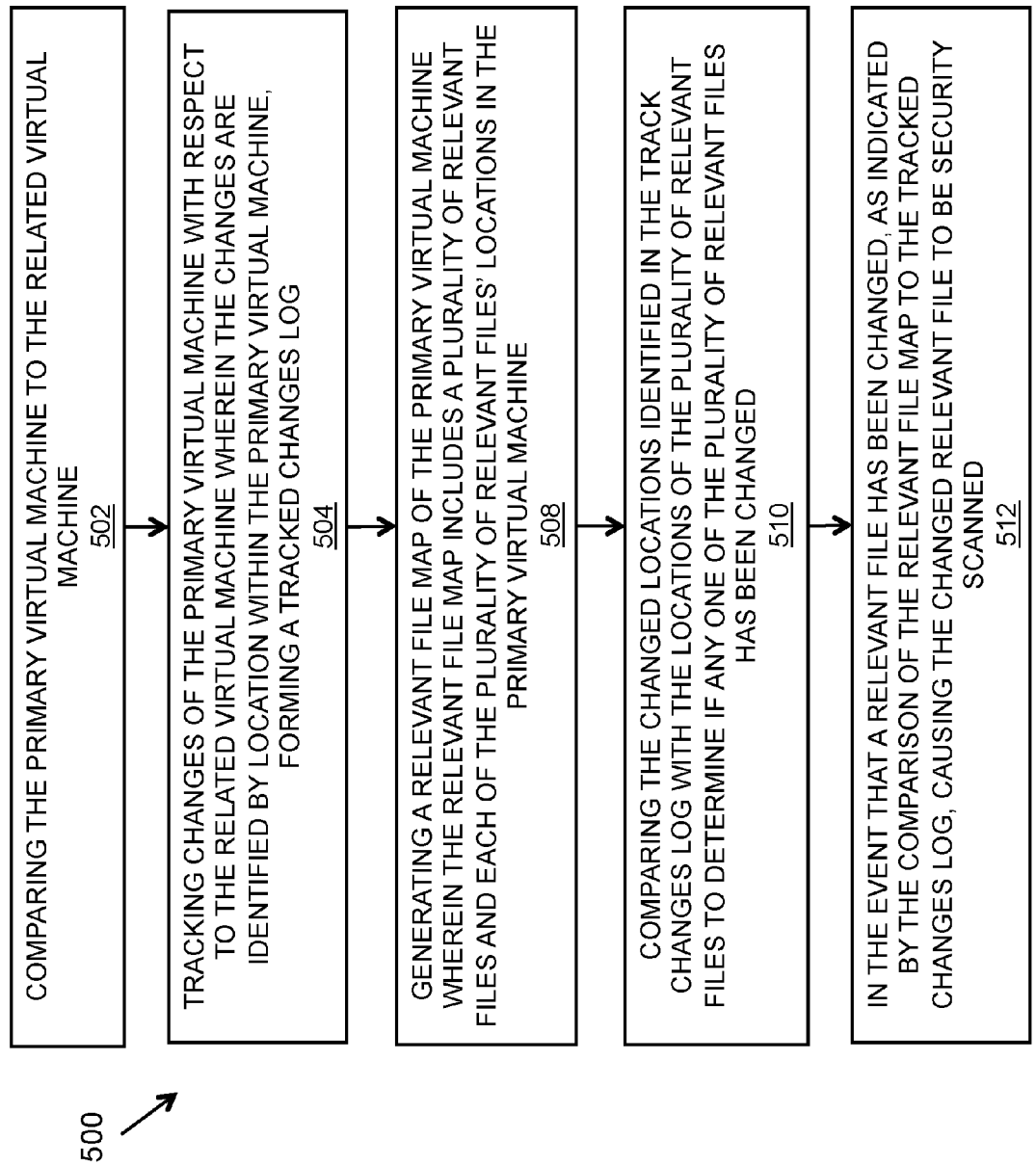
FIG. 5 depicts a process that reduces scanning requirements of a primary virtual machine based on an understanding of a related virtual machine.

Referring to FIG. 5, a flowchart for a process that reduces scanning requirements of a primary virtual machine based on an understanding of a related virtual machine is depicted. In the process, a map is built that shows the locations of each of the relevant files in the child. Then, comparisons of the parent and the child may be run based on locations. Every time the child is changed, this comparison is run and it is used to identify locations that have been changed. The process will look at the relevant file map to see if the changed location includes a relevant file. If so, the child will target the file for scanning because it is relevant and it has been changed. The process begins at step 502 where in response to a change in the primary virtual machine, the primary virtual machine is compared to the related virtual machine. Changes of the primary virtual machine with respect to the related virtual machine, identified by location within the primary virtual machine, are tracked and logged in a tracked changes log at step 504. At step 506, a relevant file map of the primary virtual machine is generated, wherein the relevant file map includes a plurality of relevant files and each of the plurality of relevant files' locations in the primary virtual machine. At step 510, the changed locations identified in the track changes log are compared with the locations of the plurality of relevant files to determine if any one of the plurality of relevant files has been changed. Finally, at step 512, in the event that a relevant file has been changed, as indicated by the comparison of the relevant file map to the tracked changes log, the changed relevant file is security scanned.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computers, reduces scanning requirements of a primary virtual machine based on an understanding of a related virtual machine, by performing the steps of:

creating the primary virtual machine as a child of the related virtual machine, wherein the related virtual machine is whitelisted with respect to a security requirement at the time of creation of the primary virtual machine;

in response to a change in the primary virtual machine, comparing the primary virtual machine to the related virtual machine and tracking changes of the primary virtual machine with respect to the related virtual machine wherein the changes are identified by location within the primary virtual machine, forming a tracked changes log;

generating a relevant file map of the primary virtual machine wherein the relevant file map includes a plurality of relevant files and each of the plurality of relevant files' locations in the primary virtual machine;

comparing the changed locations identified in the track changes log with the locations of the plurality of relevant files to determine if any one of the plurality of relevant files has been changed; and performing a security scan of the primary virtual machine, wherein in the event that one of the relevant files has not been changed relative to the related virtual machine that has been whitelisted, excluding the one of the relevant files from the security scan, and further wherein in the event that one of the relevant files has been changed, as indicated by the comparison of the relevant file map to the tracked changes log, causing the changed relevant file to be security scanned.

2. The computer program product of claim 1 wherein if a tracked change exists, but the map indicates that no relevant files reside in that location, then no security scan is done.

3. The computer program product of claim 1, wherein an alert is generated prior to the security scan.

4. The computer program product of claim 1, further comprising, allowing the security scan to be deferred by a user.

5. The computer program product of claim 1, further comprising, if a change in the related virtual machine is indicated in the tracked changes log, the user is given the option of performing additional tasks.

6. The computer program product of claim 5, wherein the additional task is updating a policy prior to a re-scan.

7. The computer program product of claim 5, wherein the additional task is deploying a remedial action.

8. The computer program product of claim 5, wherein the additional task is encrypting the data.

\* \* \* \* \*